Inventors.
Burgess H. Jennings
Franklyn C. W. Olson &
Edward Bigg,
By:- Mann and Brown
Attys Patented Sept. 26, 1950

2,523,371

UNITED STATES PATENT OFFICE 2,523,371

VAPORIZER

Burgess H. Jennings and Edward Bigg, Evanston, and Franklyn C. W. Olson, Wilmette, Ill., assignors, by mesne assignments, to Research Corporation, New York, N. Y., a corporation of New York Application May 10, 1946, Serial No. 668,946

4 Claims. (Cl. 21—74)

1

This invention relates to an apparatus for vaporizing liquid and more particularly to an apparatus for producing a substantially constant proportion of constituent vapors from a miscible mixture of two or more liquids having different boiling points.

Controlled vapor output from a vaporizer becomes important when the amount and concentration of a vapor being delivered to an enclosed space determines the intended effectiveness of the vapor. Thus, if a vapor is used to sterilize an atmosphere and the vapor concentration is an important factor in achieving the desired sterilization, correct vaporizer design to give the desired vapor concentration is required. As an example, of such a requirement, it has been found that a composite vapor consisting of 3% triethylene glycol vapor and 97% water vapor is effective in achieving air sterilization and to prevent air-borne infection when supplied to a treated space in adequate quantity.

Assume that such a vapor proportion can be obtained by boiling a miscible binary mixture of 90% triethylene glycol and 10% water. An ordinary vaporizer would be ineffective to maintain the desired 3% triethylene glycol vapor-97% water vapor output because, as the binary liquid mixture of triethylene glycol and water is boiled, more water than triethylene glycol is vaporized with the result that the concentration of the liquid in the vaporizer would change and, hence, the vapor ratio output would also change. Also, because the miscible binary mixture would now contain a greater relative proportion of triethylene glycol to water than did the original mixture, the boiling point, and hence the temperature of the mixture, would increase. Continued increase in mixture temperature as the concentration of triethylene glycol increases, could result in overheating the mixture and the possible release of impurities through break down of the triethylene glycol. Such impurities could be detrimental to air sterilization and to individuals breathing such air. Thus, when the generated vapor is used for air sterilization and germicidal purposes it is important to prevent the introduction of impurities, which might raise the possibility of toxicity, into air being breathed by persons. If a source of such impurities could be overheating of the liquid in a vaporizer, brought about by an incorrect concentration of such liquid where the concentration is dependent upon the relative proportion of components forming the liquid, then a vaporizer is needed that will maintain liquid concentration, and hence

2 the vapor concentration, substantially constant. We have found that a 3% triethylene glycol vapor-97% water vapor output ratio, when maintained substantially constant, can be delivered to a treated space without fear of a chemical breakdown of the liquid mixture undergoing heating.

While we have used triethylene glycol and water as an example, the problem of maintaining liquid concentration substantially constant exists whenever one heats a miscible mixture of liquids having different boiling points and it is desired to maintain a vapor output of substantially constant predetermined concentration. The liquid concentration required to maintain the correct output vapor ratio can be determined from the temperature composition diagram of the particular miscible mixture being used. A satisfactory vaporizer for such a mixture will include means to compensate for the greater loss of the more volatile liquid component if the original liquid concentration is to be maintained and, hence, the output vapor ratio or concentration is to remain substantially constant.

Accordingly, the principal object of the present invention is to provide an apparatus for introducing a vapor of substantially constant predetermined component proportion into an atmosphere and to maintain the output vapor proportion substantially constant during operation of the apparatus. Other objects of the present invention are to provide apparatus for vaporizing liquid to produce vapor of substantially constant component proportions which includes means to maintain the liquid concentration substantially constant during heating; to provide such an apparatus which includes means to admit additional liquid to the liquid mixture during heating of the latter and to control the rate of admission of the additional liquid; and to provide such an apparatus which includes a thermal element and a positive mechanical connection between the thermal element and the means to admit additional liquid so that the thermal element controls the admission of additional liquid.

These and other objects of our invention will become apparent from the following detailed description taken in conjunction with the accompanying drawings in which—

Figure 1:
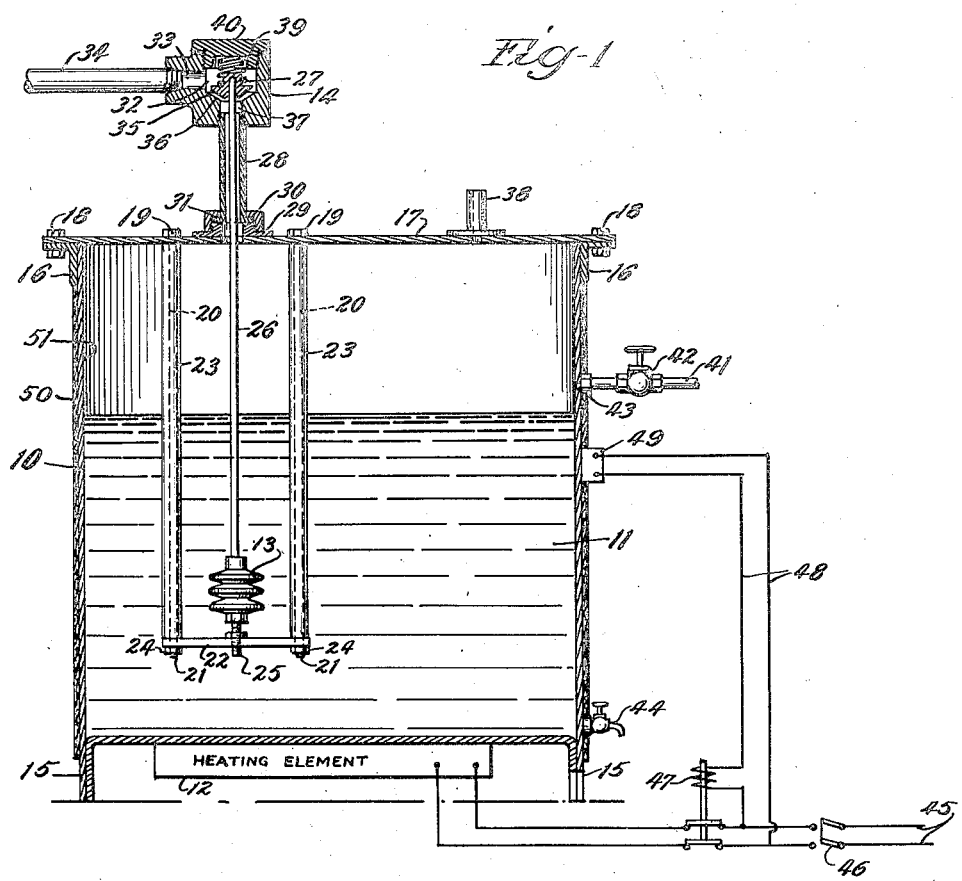
Fig. 1 is a front elevational view in cross section of the vaporizing apparatus including a schematic wiring diagram showing the connection of the electrical elements in which the heating tank and valve chamber for admitting a liquid to the tank are shown in cross section and the remaining elements are shown in their respective front elevational views.

Referring to Fig. 1, the principal elements of the vaporizer are a tank 10 for containing the liquid 11 to be vaporized, a heating element 12 for heating said liquid, and a bellows member 13 mechanically coupled to a valve assembly 14 to control the admission of a liquid component to tank 10 to thereby control the concentration of the liquid mixture in the tank.

Tank 10 can be either a circular or squared metal container, the size being dependent upon the quantity of liquid to be vaporized. In the embodiment shown in Fig. 1, tank 10 is mounted on support members 15 of sufficient height to raise the bottom of the tank above the floor level to permit the heating element 12 to be positioned beneath the bottom of the tank. Heating element 12 is attached to the underside of tank 10 by a suitable means, not shown. Heating element 12 can be either a flame source of heat or a convective or radiant heater, such as an electric heating coil. In our embodiment we use an electric radiant heating element which can be either of 1000 watts or 2000 watts rating or other appropriate value, depending upon the power source available, the size of the tank being heated, and the desired rate of vaporization.

It is obvious, though not shown, that by means of either a voltage or resistance control, the heat output of a particular radiant heater could be controlled as desired to vary the rate of vaporization.

Tank 10 is flared at 16 to receive a cover 17, attached to the tank by means, such as flange bolts 18. Attached to cover 17, and held by means such as nuts 19, are a pair of metal support rods 20 which are threaded at their lower ends 21. Threaded ends 21 extend through openings in a support block 22, the latter being made of substantially noncorrosive material. Intermediate the support block 22 and the underside of cover 17, support rods 20 are enclosed by hollow metal sheet members 23. Nuts 24 engage threaded ends 21 of support rods 20 and hold support block 22 in abutting engagement with the lower ends of sheath members 23, as shown in Fig. 1.

Support block 22, in turn, supports a metallic bellows member 13 by the attachment thereto of a threaded support rod 25 which is in threaded engagement with block 22. If desired, bellows member 13 could be supported by members extending from the sides of the tank 10, or even by members, preferably insulated, extending from the bottom of said tank. Bellows member 13 has an actuating rod 26 attached thereto and extending from the top thereof. As is shown in Fig. 1, rod 26 extends through the cover 17, through pipe member 28, through the lower portion of valve block 14 and terminates in valve head 27.

The opening in cover 17, through which rod 26 passes, is surrounded by a collar member 29 which is threaded, as shown in Fig. 1, to receive a threaded clamping ring 30. At its lower end, pipe 28 has an outer flange 31 integral therewith and clamping ring 30 engages the upper surface of flange 31, thereby holding pipe 28 against collar 29, as is shown in Fig. 1. Pipe 28 can be released by loosening ring 30. Pipe 28 is threaded at its upper end into the lower portion of valve block 14.

Valve block 14 contains a chamber 32. Chamber 32 is connected through passage 33, to liquid inlet 34. The bottom portions of chamber 32 slope, as shown, to provide a valve seat 35, which is engaged by the valve seat engaging portion 36 of valve head 27. Valve head 27 is biased to seated position by spring 39 or, if spring 39 is omitted, by the action of gravity. Passage 37, of greater diameter than rod 26, connects chamber 32 to outlet pipe 28. Outlet pipe 28 is connected, as shown, to permit entry of liquid into tank 10. Valve block 14 is suitably supported by support means, not shown, to maintain the necessary alignment to permit the desired valve action.

Vapors generated by heating tank 10 leave the tank through outlet 38. Although in the particular embodiment shown, a single outlet through the cover 17 is shown, it is obvious that a plurality of such outlets could be provided in the cover, or near the top of the vertical sides of tank 10. Cover 17 can be raised from tank 10 by removing threaded cap member 40 on valve block 14 and then removing valve head 27, or rod 26 can be removed in its entirety, and then loosening nuts 18 and 19. If rod 26 is not removed, the cover can be raised vertically or, if rod 26 is removed, the cover could be tilted. In either event, the cover can be raised sufficiently to permit inspection of the interior of the tank 10 and to admit liquid into tank 10 from the top if it is desired to add the liquid in this manner. An additional liquid inlet pipe 41, having a flow control valve 42, is shown connected to tank 10 at 43. The initial liquid mixture preferably can be added through this connection. Also, this liquid entry, which is manually controllable, permits addition of a single component of the mixture if such is desired. Drain cock 44 is provided to permit drainage of the tank.

Since we utilize an electric radiant heating element, we show in Fig. 1, lead-in wires 45 from an electrical power source, either 110 or 220 volts, dependent upon the size and rating of the particular heater being used. Switch 46 provides manual on or off connection of the heater element to the power source. A suitable cutout, such as electromagnetic cut-out 47, is also provided. Cut-out 47 is controlled and connected by leads 48 to an adjustable thermostat 49 which is mounted, as shown, on the outer vertical side of tank 10. Thermostat 49 is a safety device to prevent overheating of the tank. The thermostat is set at a predetermined maximum high temperature value, and when this temperature value is reached, the thermostat energizes cut-out 47 which, in turn, opens the circuit connecting the heater element 12 to the power source. If desired, cut-out 47 can be provided with a manual reset.

In Fig. 1, we show tank 10 and cover 17 insulated with an insulation covering 50, which is provided to reduce heat loss from the tank. An air-cell type asbestos, 1½" thick, is suitable. When the liquid mixture contained in tank 10 is corrosive in nature, or produces corrosive vapors, it is necessary to line metal surfaces which are exposed to the vapors, such as the interior of the tank and the underside of the cover member, with a suitable corrosion resistant material. Thus, we show, at 51, an inner lining of copper plating to prevent tank corrosion where a miscible binary mixture of tri-ethylene glycol and water is the solution to be vaporized in our apparatus.

The operation of our apparatus is as follows:

The liquid concentration of a miscible mixture necessary to obtain a substantially constant predetermined proportion between the constituent vapors generated upon heating said mixture can be determined from the temperature composition diagram of the particular mixture chosen. Thus, we show in Fig. 2, as an example, the temperature composition diagram of a miscible binary mixture of triethylene glycol and water.

Assume that we desire a vapor proportion of 3% triethylene glycol vapor to 97% water vapor. This proportion is indicated at point A on the diagram shown in Fig. 2. A vertical line from point A intersects the vapor composition curve at point B. A horizontal line drawn from point B intersects the liquid composition curve at point C. A vertical line dropped from point C intersects the horizontal axis at point D. The reading at point D shows 90% triethylene glycol and 10% water as the composition of the liquid to be added to tank 10.

Figure 2:
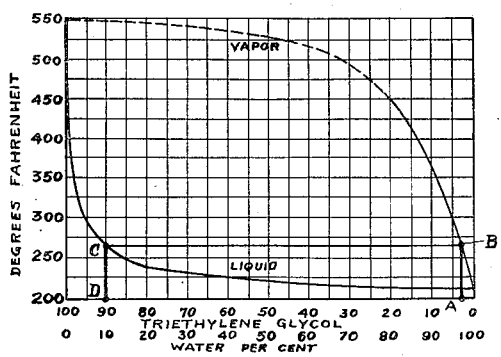
Fig. 2 shows a temperature composition diagram for a miscible binary mixture of triethylene glycol and water.

Fig. 2 further shows that this liquid boils at 260° F. to produce vapors having a proportion of 3% triethylene glycol vapor and 97% water vapor.

Tank 10 is filled to the desired level, at least to a level sufficient to immerse the bellows member 13 with a miscible mixture of liquids having different boiling points which, as we have indicated as an example, can be a miscible binary mixture of triethylene glycol and water. The filling of tank 10 can be accomplished by raising cover 17 to permit entry of the liquid, or better, tank 10 could be filled from inlet pipe 41. Bellows member 13 may also be filled with a miscible mixture having the same liquid composition as the liquid initially put into tank 10, or with a different liquid having the same boiling temperature as the liquid initially put into the tank. Bellows member 13 should then be hermetically sealed. Before heating is commenced, the cover is tightened and all connections checked.

Heater element 12 is then energized. When the liquid in tank 10 boils, and still taking as an example a miscible binary mixture of triethylene glycol solution, having 90% triethylene glycol and 10% water, more water than triethylene glycol is vaporized. Vaporization of more water than triethylene glycol raises the concentration of the latter in the mixture remaining in tank 10 and, consequently, raises the boiling point thereof. This can be observed from the liquid composition curve shown in the diagram in Fig. 2.

Since bellows member 13 contains a liquid having the same boiling point as the liquid initially admitted to tank 10, when the composition of the latter is changed and consequently its boiling point is changed, which change is assumed to be a rise in boiling point, the liquid in the bellows will vaporize. Vaporization of this liquid causes the bellows to expand and, through rod 26 the bellows unseats valve head 27. When valve head 27 is unseated liquid flows from chamber 32 through passage 37 and pipe 28 into tank 10. Still continuing the example of triethylene glycol and water, the liquid admitted through the valve arrangement can be either water or a miscible binary mixture of triethylene glycol and water in which the proportion of triethylene glycol to water is substantially the same, or less, as the proportion of triethylene glycol vapor to water vapor in the vapor output. If the liquid added is a mixture of triethylene glycol and water having these components in substantially the same, as defined hereafter, proportion as the constituent vapors in the output, both the glycol and the water, already in the tank, are replenished whereas, if the liquid added is simply water, or a mixture of triethylene glycol and water having these components in less proportion than the constituent vapors in the output, there is a slow loss of triethylene glycol and a resultant slow drop in the level of the liquid in the tank. However, as this liquid level drop would only be appreciable after prolonged heating it does not interfere with practical operation of our apparatus and when required, additional pure triethylene glycol can be admitted through inlet pipe 41. When a dilute mixture of triethylene and glycol is added to the relatively concentrated mixture being heated in the tank to replenish the concentrated mixture, it is necessary to provide a slightly higher proportion of triethylene glycol in the liquid being added than the proportion to triethylene glycol vapor in the vapor output. Thus, if the triethylene glycol vapor in the vapor output is 3% of the total vapor, the proportion of triethylene glycol liquid in the liquid being added to replenish the original mixture should be approximately 5%. This slightly higher value is required because replenishing cannot take place instantaneously and it is necessary to compensate for the loss of volume due to a slight time lag in the operation of bellows member 13. However, the 5% value is substantially the same as the 3% value in the output vapor. In either event, whether water alone is added to the original mixture or a mixture of water and triethylene glycol of substantially the same or less proportion as the vapor proportion, the net result is to lower the triethylene concentration in the mixture being heated and, hence, the boiling point of that mixture is lowered. That lowering the concentration of triethylene glycol lowers the boiling point can be observed from Fig. 2. This lower temperature causes bellows member 13 to contract, and through rod 26, to reseat valve head 27 to shut off the flow through passage 37 and pipe 28, thereby stopping the entry of water into tank 10. On continued heating this cycle is repeated. The sensitivity of the control effected by bellows member 13 can be controlled by choice of the type of bellows used.

It is necessary to have a low pressure liquid source, using either water or a dilute mixture of triethylene glycol and water as an example, connected to inlet 34 to allow the liquid entering tank 10 through valve arrangement 14 to mix adequately with the liquid already in the tank. This liquid flow should be restricted to two gallons per minute, or less, otherwise the admitted liquid will mix inadequately and may form "cold pockets" which, upon heating, may erupt and possibly force hot glycol directly through opening 38. Although we have not shown a high level liquid safety cut-off to stop the flow of liquid into the tank in the event of a bellows failure, it is obvious that such an arrangement could be provided.

It will be seen that we have provided an apparatus for introducing a vapor into an atmosphere where the vapor is of substantially constant component proportion and where this component proportion is maintained by controlling the concentration of the liquid which is heated to produce the vapor. Although we have used the illustration of a binary mixture, the teaching of our invention can be applied to a miscible mixture of more than two liquids having different boiling points where it is desired to maintain the vapor output ratio substantially constant by maintaining the liquid concentration, and the apparatus we have described can, without departing from the spirit and scope of our invention, be readily adapted for such use.

Thus, while we have described a particular embodiment of our invention it is to be understood that we do not wish to be restricted to this, and that we intend to cover all modifications thereof which would be apparent to one skilled in the art and which come within the spirit and scope of our invention.

We claim:

1. In apparatus for generating and delivering to the atmosphere a predetermined proportion of glycol and water vapor, the combination of a container open to the atmosphere and adapted to contain a mixture of glycol and water in specified proportions, means for heating said mixture to cause vaporization to occur, means for replenishing water dissipated by vaporization, said replenishing means including an inlet, and control means for regulating the admission of the replenishing liquid through said inlet to the container, said control means including a variable flow valve and a thermostatic bellows, said bellows being connected at one end to said valve for controlling its position and hence the rate at which replenishing liquid is admitted to the container, said bellows containing a liquid which boils at a temperature corresponding substantially to that of said liquid mixture of specified proportions, whereby any tendency for the glycol concentration of the liquid mixture in the container to increase will result in the admittance of additional water to offset that tendency.

2. In apparatus for generating and delivering to the atmosphere a predetermined proportion of glycol and water vapor, the combination of a container open to the atmosphere and adapted to contain a mixture of glycol and water in specified proportions, means for heating said mixture, means for replenishing, in substantially the same proportion as glycol and water are lost through vaporization, the liquid dissipated by vaporization, said replenishing means including an inlet, and control means for regulating the admission of the replenishing liquid through said inlet to the container, said control means including a variable flow valve and a thermostatic bellows, said bellows being connected at one end to said valve for controlling its position and hence the rate at which replenishing liquid is admitted to the container, said bellows containing a liquid which boils at a temperature corresponding substantially to that of said liquid mixture of specified proportions, whereby any tendency for the glycol concentration of the liquid mixture in the container to increase will result in the admittance of additional water and glycol to offset that tendency.

3. The apparatus as set forth in claim 1 in which a thermostat responsive to the temperature of the glycol mixture in the container automatically controls the operation of said heating means.

4. The apparatus as set forth in claim 1 in which the variable flow valve is spring-pressed to closed position.

BURGESS H. JENNINGS.
EDWARD BIGG.
FRANKLYN C. W. OLSON.

REFERENCES CITED

The following references are of record in the file of this patent:

UNITED STATES PATENTS

| Number | Name | Date |
|---|---|---|
| 2,290,425 | Guernsey | July 26, 1942 |
| 2,369,900 | Jennings et al. | Feb. 20, 1945 |